United States Patent
O'Connor et al.

(10) Patent No.: US 6,178,510 B1
(45) Date of Patent: Jan. 23, 2001

(54) TECHNIQUE FOR SECURE NETWORK TRANSACTIONS

(75) Inventors: William Y. O'Connor, Saddle River, NJ (US); Donald L. Stanford, Pawtucket, RI (US); Tariq M. Khan; Michael A. Hutton, both of East Greenwich, RI (US); Steve W. Beason, Exeter, RI (US); Robert C. Angell, West Greenwich, RI (US)

(73) Assignee: GTech Rhode Island Corporation, West Greenwich, RI (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/923,653

(22) Filed: Sep. 4, 1997

(51) Int. Cl.$^7$ .............................. H02H 3/05; H04L 1/22
(52) U.S. Cl. ................................. 713/201; 713/200
(58) Field of Search .................... 395/187.01, 186, 395/188.01, 200.41, 200.42, 200.46, 200.59; 380/4, 23, 25, 3; 340/825.31, 825.32; 713/200, 201, 202; 709/225, 229

(56) References Cited

U.S. PATENT DOCUMENTS

| | | | |
|---|---|---|---|
| 4,652,698 | * 3/1987 | Hale et al. | 380/24 |
| 4,652,990 | * 3/1987 | Pailen et al. | 364/200 |
| 4,672,572 | * 6/1987 | Alsberg | 395/187.01 |
| 4,691,355 | * 9/1987 | Wirsprom et al. | 380/23 |
| 4,694,492 | * 9/1987 | Wirsprom et al. | 380/23 |
| 4,922,521 | * 5/1990 | Krikke et al. | 379/95 |
| 5,113,499 | * 5/1992 | Ankney et al. | 395/325 |
| 5,343,529 | * 8/1994 | Goldfire et al. | 380/23 |
| 5,604,803 | 2/1997 | Aziz | 380/25 |
| 5,668,950 | * 9/1997 | Kikuchi et al. | 395/200.47 |
| 5,679,940 | * 10/1997 | Templeton et al. | 235/380 |
| 5,826,014 | * 10/1998 | Coley | 395/187.01 |

* cited by examiner

*Primary Examiner*—Dieu-Minh T. Le
(74) *Attorney, Agent, or Firm*—Edwards & Angell, LLP

(57) ABSTRACT

A system for performing regulated transactions is used with a network that is commonly accessible by a plurality of communication terminals. A gatekeeper, coupled to the network, permits access to the system only if authorization information, as indicated by an authorization signal received by the gatekeeper from a communication terminal via the network, complies with at least one predetermined criterion. The authorization information includes information independent of information supplied by a communication terminal user and independent of information indicative of a communication line coupled to the user's communication terminal. A host, coupled to the gatekeeper, receives a first signal from the user's communication terminal through the network and sends a second signal through the network to the user's communication terminal in response to the first signal.

69 Claims, 4 Drawing Sheets

TECHNIQUE FOR SECURE NETWORK TRANSACTIONS

BACKGROUND OF THE INVENTION

The present invention relates to transactions made over telecommunication networks. In particular, the present invention relates to a technique for making secure gaming transactions over telecommunication networks.

As technology advances, an increasing number of transactions occurs electronically. Persons may now perform myriad transactions electronically, such as by using telecommunication equipment. For example, individuals can conduct their banking business from home or elsewhere using a computer, a telephone or an automatic teller machine. Many persons also conduct transactions on the Internet using computers and televisions adapted for Internet access. Electronic transactions include, but are not limited to, playing games including wagering games, performing research, making purchases, and communicating with other persons.

With the increase in electronic transactions, there is a concomitant increase in transactions involving sensitive information. These transactions include transmission and receipt of, and access to, sensitive information. The transmission of sensitive information using publicly-accessible channels presents security concerns. For example, persons wishing to conduct banking transactions or to make purchases over a publicly-accessible telecommunication network need assurances that they are in fact dealing with the entity with which they desire to communicate.

It may be desirable to regulate certain transactions due to the nature of the transactions. For example, gaming transactions, especially those gaming operations involving wagering, are often regulated by various levels of government. The regulation may include several transaction criteria including geographic restrictions and age requirements. Access to sensitive material, such as material of a violent nature, may also be regulated publicly through the government or privately through the supplier of the information.

There are many problems with the provision of sensitive information and services over publicly-accessible channels such as networks, including the Internet.

At least one problem is that if a user seeks to access information or a service over the Internet, there is no face-to-face interaction between the user and the provider of the information or service. Because there is no face-to-face contact, it is difficult to assure that a person or entity on either end of the communication meets required criteria or is the person or entity purported to be. In other words, a person may lie as to who he or she is in order to gain access to information or services that he or she is not entitled to receive.

Additionally, because access may be achieved over global telecommunication systems such as telephone lines and the Internet, providers of information and services often do not know the geographic location of a person attempting to gain access to the information or services. In some cases, access to certain information or services may be restricted to persons within certain geographic regions.

Attempts to assure the status of a person attempting to gain access to information or services or to whom a person is going to transmit sensitive data have fallen short of desired levels of certainty. For example, a common technique used on many Internet web sites to control access to information and services is simply to ask the person requesting access to answer one or more questions. Based on the responses to the questions, the person may gain immediate access to the resources. Alternatively, an investigation may be undertaken to determine whether a person corresponding to the information provided meets criteria for access to the resources. Such systems, however, rely upon the integrity of the person providing the information.

These attempts to provide assurances are inadequate because they are susceptible to the user's lying in order to gain access to resources. Users may provide false information including, but not limited to, information identifying a person other than the user and false information as to the user's location. Also, a person may falsely represent the person's or an entity's identity in order to have a user provide sensitive information that the user would not provide if the user knew the person's or entity's actually identity.

A need therefore exists for a technique that better regulates who can gain access to information and services over telecommunication networks and to whom persons transmit sensitive information.

SUMMARY OF THE INVENTION

The present invention provides a technique for improved regulation of telecommunication transactions. Applying the teachings of the present invention, providers of regulated information or services can better ensure that persons gaining access to the information or services meet predetermined criteria. Information and services may be provided over telecommunication systems and networks that would otherwise not be allowed. Additionally, more persons may decide to conduct sensitive transactions over telecommunication systems such as the Internet if those persons are better assured that they are transmitting sensitive information only to those persons or entities to whom they desire to transfer that information.

In general, in one aspect, the invention features a system for performing regulated transactions for use with a network that is commonly accessible by a plurality of communication terminals. A gatekeeper, coupled to the network, permits access to the system only if authorization information, as indicated by an authorization signal received by the gatekeeper from a communication terminal via the network, complies with at least one predetermined criterion. The authorization information includes information independent of information supplied by a communication terminal user and independent of information indicative of a communication line coupled to the user's communication terminal. A host, coupled to the gatekeeper, receives a first signal from the user's communication terminal through the network and sends a second signal through the network to the user's communication terminal in response to the first signal.

Implementations of the invention may also include one or more of the following features. The authorization signal may be encoded and the gatekeeper may be capable of decoding the authorization signal. The gatekeeper may transmit an identification signal over the network indicative of the identity of the gatekeeper to the user's communication terminal.

The first signal may be indicative of a gaming instruction and the host may perform a gaming operation and generate the second signal indicating a result of the gaming operation corresponding to the gaming instruction indicated by the first signal. The system may include a game repository, coupled to the gatekeeper, that stores a plurality of games. The host may be capable of downloading games from the game repository through the gatekeeper. The first signal may be indicative of a gaming instruction, the game repository may perform a gaming operation, and the host may communicate with the game repository and generate the second signal indicating a result of the gaming operation corresponding to the gaming instruction indicated by the first signal. The gatekeeper and host may be associated with a gaming jurisdiction and the at least one predetermined criterion may require that the authorization signal is indicative of the user's compliance with regulations of the gaming jurisdiction.

In general, in another aspect, the invention features a gaming system for use with a network that is commonly accessible by a plurality of communication terminals. A host is capable of receiving a first signal indicative of a gaming instruction and transmitting a second signal indicative of a result of a gaming operation. A gatekeeper, coupled to the host and to the network, permits access to the host to authorized game players only. A game repository, coupled to the gatekeeper, is capable of storing a plurality of games.

Implementations of the invention may also include one or more of the following features. The host may be a first host and the gatekeeper may be a first gatekeeper, such that the system includes a second host, a second gatekeeper coupled to the second host, and an access controller, coupled to and interposed between the network and the gatekeepers, that controls access to the first gatekeeper by a communication terminal user and by the second gatekeeper. The access controller may be coupled to the game repository and control access to the repository by the gatekeepers. The network may include the Internet and the access controller may include a private network that is accessible through an Internet site.

In general, in another aspect, the invention features a computer program product for use with a system including a network that is commonly accessible by a plurality of communication terminals and an access control device coupled to the network. The computer program product may include a computer-readable memory having authorization signal code that causes a communication terminal to supply an authorization signal to the access control device via the network, the authorization signal being indicative of authorization information including information independent of information supplied by a user of the computer program product and independent of information indicative of a communication line coupled to the communication terminal.

Implementations of the invention may also include one or more of the following features. The authorization information may be associated with the computer program product. The computer-readable memory may include code that processes an authorization response signal, received from the access control device, indicative of a response to the authorization signal.

The system may include a host device, coupled to the access control device, to which a user desires access, and the computer-readable memory may include code that allows the user to instruct the user's communication terminal to supply an action signal to the host device and code that processes an action response signal indicative of a response to the action signal.

The computer-readable memory may include copy-prevention code that prevents duplication of the authorization signal code. The authorization signal code may be original authorization signal code and the copy-prevention code may cause an attempted copying of the original authorization code to create new authorization signal code that is different from the original authorization signal code. The computer program product may include alteration code that disables the authorization signal code if a copy of the authorization signal code is attempted to be made.

The computer-readable memory may be adapted for use with multiple software platforms. The authorization signal code may be written in JAVA programming language. The computer-readable memory may include code that processes a global positioning signal and instructs the user's communication terminal to send a location signal indicative of information in the global positioning signal to the access control device. The computer-readable memory may include code that instructs the user's communication terminal to send a location signal indicative of a location of the user's communication to the access control device. The computer-readable memory may include code that instructs the user's communication terminal to send user-identification information to the access control device periodically.

In general, in another aspect, the invention features a computer program product for use with a system including a network that is commonly accessible by a plurality of communication terminals, a host device to which a user desires access, and an access regulator, coupled to the host device and to the network, that regulates access to the host device. The computer program product includes computer-readable memory having code that processes an authorization signal received from the user's communication terminal indicative of authorization information including information independent of information supplied by the user and independent of information indicative of a communication line coupled to the user's communication terminal, and code that instructs the access regulator to permit the user's communication terminal to communicate with the host device only if the authorization information meets at least one predetermined criterion.

Implementations of the invention may also include one or more of the following features. The authorization information may be associated with a communication terminal from which the user requests access to the host device. The computer-readable memory may include code that determines a location of the user's communication terminal. The computer-readable memory may include code that processes a location signal indicative of a location of the user's communication terminal.

The computer program product may include code that receives a gaming action signal indicative of a gaming action desired by a user, code that determines an outcome of the desired gaming action, and code that causes transmission of an outcome signal to the user's communication terminal indicative of the outcome of the user's desired gaming action.

The computer program product may include code that performs a game. The computer program product may be used with a game repository storing a plurality of games, the computer program product including code that instructs the game repository to perform a game. The computer program product may include code that receives outcomes of activities of gaming interest via the network.

In general, in another aspect, the invention features a system for performing regulated transactions for use with a network that is commonly accessible by a plurality of communication terminals. A repository stores a plurality of computer programs. A transaction controller is coupled to the network and to the repository. Access to a program by the transaction controller is permitted only if appropriate authorization includes information independent of information supplied by a communication terminal user and independent of information indicative of a communication line coupled to the user's communication terminal.

Implementations of the invention may also include one or more of the following features. The transaction controller may be capable of downloading a program from the repository. The transaction controller may be capable of instructing the repository to run a selected program.

The repository may transmit results of the running of the program to the transaction controller. The transaction controller may send an authorization signal associated with the transaction controller to the repository.

In general, in another aspect, the invention features a method of authenticating a transmission from a communication terminal. An authentication signal is transmitted from a communication terminal to an access controller, the authentication signal indicative of authorization information including information independent of information supplied by a communication terminal user and independent of information indicative of a communication line coupled to the communication terminal. The authorization information is verified that it meets predetermined criteria.

Implementations of the invention may also include one or more of the following features. The authentication information may be associated with software resident in the communication terminal. A transaction controller identification signal may be transmitted from a transaction controller to the communication terminal, the transaction controller identification signal indicative of an identity of the transaction controller. A user identification signal may be transmitted from the communication terminal to the transaction controller, the user identification signal being indicative of an identity of the user of the communication terminal. The user may enter the user identification information, or an identification device may produce the user identification information after analyzing a physical feature of the user.

The verification may include comparing the authorization information with predetermined data parameters. The verification may include processing the information according to a predetermined operation and comparing results of the operation with predetermined result parameters.

A gaming instruction may be transmitted to a host if the verifying step is successful. The gaming instruction may be processed in the host.

In general, in another aspect, the invention features a method of gaming using a network that is commonly accessible by a plurality of gaming terminals. A first gaming instruction signal is received at a first host via the network. A first request signal, corresponding to the first gaming instruction, is transmitted from the first host to a central repository. A second gaming instruction signal is received at a second host via the network. A second request signal, corresponding to the second gaming instruction, is transmitted from the second host to a central repository.

Implementations of the invention may also include one or more of the following features. A gaming program may be downloaded from the central repository to the first host. A gaming operation may be performed in the central repository corresponding to the first request signal. Information corresponding to the first request signal may be transmitted from the central repository to the first host. The first and second gaming instruction signals may be received from at least one communication terminal, including, before the receiving and transmitting steps, verification that authentication information from the at least one terminal meets at least one criterion, the authentication information including information independent of data entered by a user of the at least one terminal and independent of information indicative of a communication line coupled to the at least one terminal.

The present invention provides many advantages for transactions using telecommunication devices. Using the present invention, providers of information and services can better assure which persons have access to the resources, and the status of those persons, thereby allowing the provider to comply with governmental and other regulations. Persons desiring to transmit confidential information using a telecommunication device can also be better assured that they are transferring the information only to those persons or entities intended to receive the information. Additionally, techniques of the present invention assist with regulation of access to information and services by multiple regulatory bodies having different regulations.

Other features and advantages of the invention will become apparent from the following detailed description, and from the claims.

DESCRIPTION OF THE PREFERRED EMBODIMENTS

Figure 1:
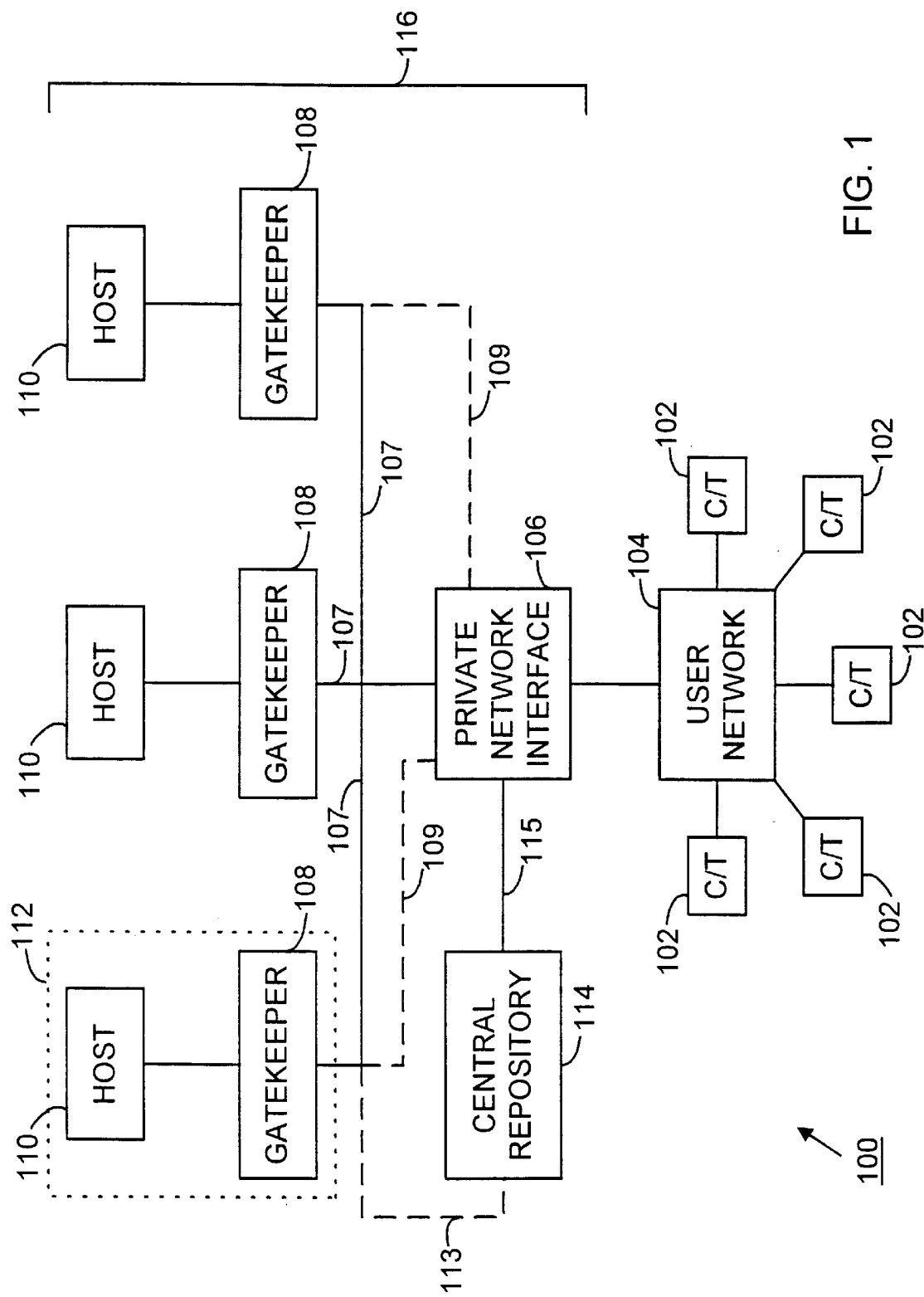
FIG. 1 is a simplified block diagram of a network transaction system according to the present invention.

FIG. 1 illustrates a simplified block diagram of a network transaction system 100 according to the present invention. The system 100 includes multiple communication terminals ("C/T") 102 coupled to a user network 104. The user network is coupled to a private network interface ("PNI") 106 that provides an interface between the user network and one or more gatekeepers or transaction controllers 108. Each gatekeeper 108 is preferably coupled to at least one host 110 and controls access to the host. Together, host 110 and gatekeeper 108 form a transaction regulation and processing unit 112. A central repository 114 may also be coupled to the gatekeepers 108 directly or through the PNI 106. The PNI, gatekeepers, hosts, and central repository may be referred to collectively as an "extranet" 116 for reasons that will be apparent from the description below.

User network 104 links a plurality of communication terminals 102. The user network provides a link between communication terminals and a platform for individual users of the computer terminals to interact and to gain information independent of the other users.

The user network 104 is preferably "publicly accessible." In other words, there are few limitations on access to the network by the general public. An example of such a network is the Internet. The user network may be any other network that is commonly accessible from multiple communication terminals.

To gain access to user network 104, persons use communication terminals 102 which may take a variety of forms. Currently, many users access the Internet using computers and televisions adapted for Internet use. Other possible communication terminals include, but are not limited to, telephones, personal data assistants, and electronic organizers. Essentially, any device capable of interaction between a user and the network, whether or not presently available, may be included in the term communication terminal. The communication terminals may be located, among other places, in chairs, tables, seats at bus or train stations or sporting arenas, and seatbacks on airplanes.

While the communication terminals relay information between a user and the user network 104, the user network communicates with, or relays information to, the PNI 106.

The PNI 106 may act as a "firewall" to separate user network 104 from the gatekeepers 108. Communication from the user network to the gatekeepers and vice versa flows through the PNI. To limit access to the gatekeepers, the PNI may require authorization, as discussed below with respect to the gatekeepers. The PNI may operate with a different protocol than the user network. Therefore, the PNI may act as a private network connecting the various gatekeepers to allow for and to process communication between the gatekeepers.

The gatekeepers 108 have many uses. For example, the gatekeepers may provide secure access to the hosts, act as nodes for relaying information among other gatekeepers, or act as secure interfaces between the hosts and the user network, with or without using a PNI. To serve as an interface between a host and the user network, a gatekeeper may implement PNI functions, such as by performing software programs.

Preferably, the gatekeepers 108 at least control access to their respective hosts 110. Access to a host may be requested from communication terminal users through the user network 104 directly or through the user network and the PNI 106. Access to a host may also be requested through one of the other gatekeepers. Each gatekeeper may be coupled to one or more of the other gatekeepers directly, via lines 107, or indirectly through the PNI via alternate lines 109.

Upon receipt of proper authorization, gatekeeper 108 permits access to host 110, which processes the information received. The host may perform various activities with the information received, such as storing information provided, retrieving information requested, performing requested operations, tracking and recording transactions, and providing information to a sender of the information. For example, the host may retrieve and transmit information requested by the user, or track or perform operations and return information regarding a result of the operation to the user. Operations may include, but are not limited to, the running of various computer programs, such as gaming programs enabling the user to play a game such as a lottery or other wagering game, and interacting with a gaming activity or other activity such as by placing a wager.

The hosts 110 may communicate through their respective gatekeepers 108 to the central repository 114 that stores information, including computer programs. The communication may occur directly from the gatekeeper through line 113 or indirectly through the PNI 106 and line 115. Information may be added to or removed from the central repository as desired. To perform requested operations, the host may need to retrieve (e.g., download) a program from the repository or to request performance of the program by the repository. A program retrieved from the repository may be modified or customized to suit a particular host's requirements. Authorization may be required in order to gain access to part or all of the central repository.

Figure 2:
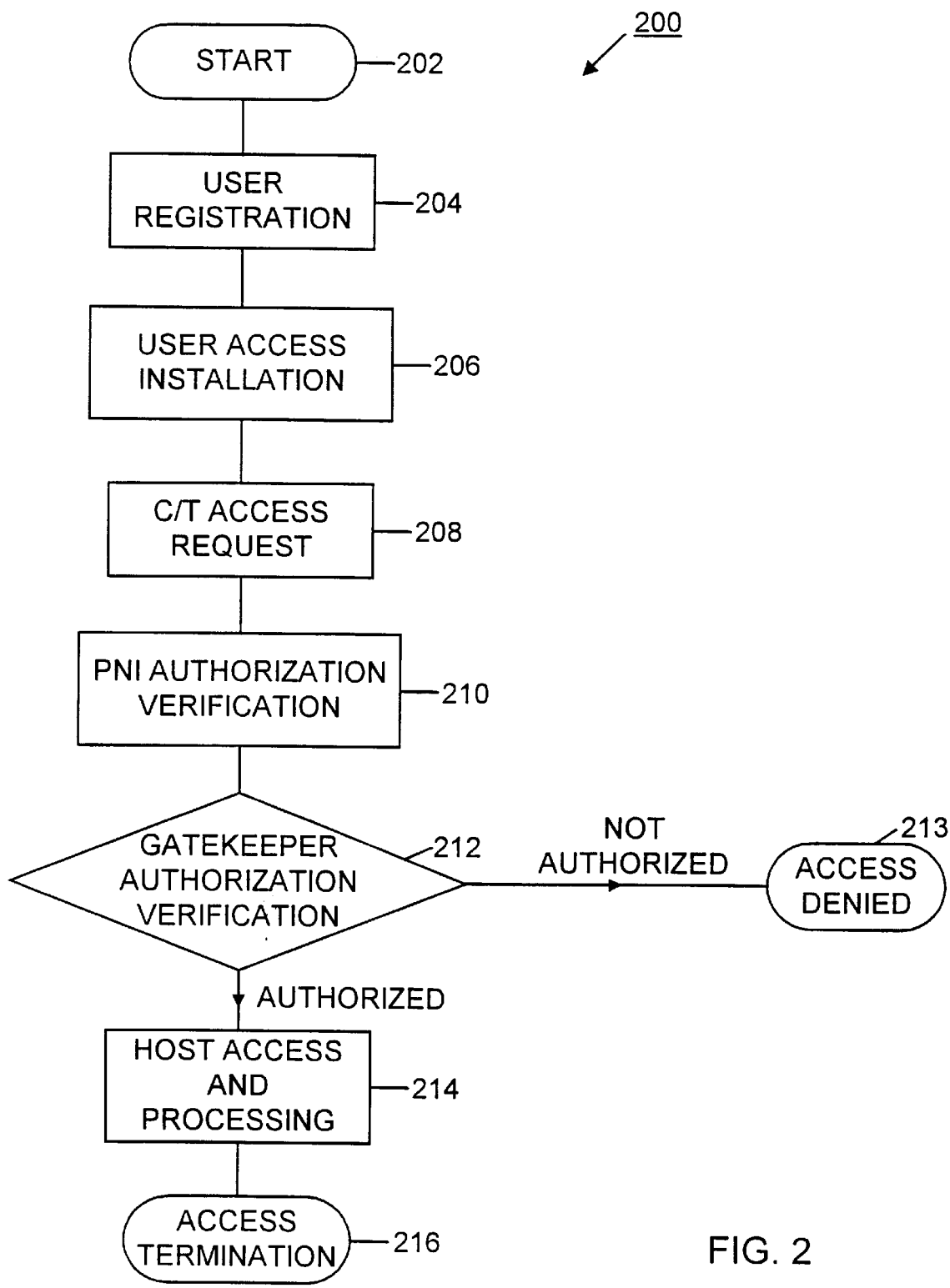
FIG. 2 is a simplified flow diagram of a method according to the present invention.

FIG. 2 illustrates a simplified flow diagram of a method 200 according to the present invention, starting at step 202.

At step 204, a user desiring access to one or more of the hosts registers to receive access authorization to the desired host or hosts. The term "user" may include multiple persons that meet the access criteria and that share a communication terminal. In a preferred embodiment, the prospective user appears in person at a predetermined location and provides personal data verifying that the user meets predetermined requirements to gain access to the desired host or hosts. More information than is currently required may be taken to accommodate future requirements, including access to new and different hosts, to avoid requiring the user to return to the predetermined location.

For example, to gain access to a host that provides gaming services, the user may be required to verify the user's age, location of desired use, or any other information that may be required by governmental or other regulatory bodies. Additionally, a provider of the gaming operations may require the user to supply information as to how the user will guarantee payment of any wagers lost and methods of payment to the user for wagers won.

Many functions of the present invention may be implemented using computer programs stored in computer-readable memory. Some or all of the programs may be adapted to interact with a variety of different platforms including different hardware configurations, programming languages, and protocols. In particular, some or all of the programs may be written in the JAVA programming language.

Once the user has provided sufficient information to indicate that the user meets required criteria for access to a host, the user may receive special software required to gain access to the host. The user would then install the software, at step 206, on the communication terminal that the user wishes to use for gaining access to the host. Alternatively, instead of providing the prospective user with software, the registration may include providing the user with a special communication terminal required to gain access to the host.

At step 208, access to a host 110 may be requested. This access may be requested by, for example, another host through its respective gatekeeper or by a user through the user's communication terminal 102, the user network 104, and the PNI 106. The present invention may be adapted to allow the user to request direct access to the host through the user's communication terminal if no user network and PNI exist or may be bypassed.

The access request step 208 may include providing access authorization information. The user's special software may provide this information in a signal to the PNI. In addition, a decryption key may be associated with each user. The decryption key may be unique to each user.

Preferably, the access authorization information is user specific and indicative of the user's personal data. Changes in the requirements for access or requests for access to other hosts may be compared with the user's personal data, whether indicated by the authorization information or not, to determine whether the user is authorized for a requested access.

At step 210, the PNI 106 may provide an authorization verification before allowing access to a gatekeeper 108. The PNI may be configured to verify whether the incoming access request has authorization for access to any of the hosts. If the incoming access request is received from one of the gatekeepers, then this authorization verification may verify whether the requesting host is authorized to gain access to any of the other hosts.

At step 212, gatekeeper 108 verifies whether the access request includes appropriate authorization information. The gatekeeper analyzes the authorization information to determine whether the requesting entity has authorization for access to the host 110. This analysis may include comparing the authorization information to stored data. Alternatively, the authorization information may be used as part of an algorithm or formula, the result of which determines whether authorization is approved. Other verification techniques may be applied.

Access may be approved for all, or only portions, of the host 110. To limit access to portions of the host, the gatekeeper may attach additional information to the access request such as a code indicative of which portions of the host the user may access. The same procedure may apply for other hosts and access to the central repository, as described below.

If the authorization information meets predetermined criteria, the gatekeeper 108 allows access to the host 110 for processing at step 214. Otherwise, the gatekeeper denies access to the host at step 213.

The authorization information should be independent of information supplied by the user and independent of a communication line coupled to the user's communication terminal. Not permitting the user to enter the authorization information will, among other things, help to reduce the user's ability to lie to gain access to a host. Not using the identity of the communication line as part of the authorization information also helps to reduce the user's ability to gain access improperly by using the communication line normally associated with an authorized user. This independent authorization information may derive from software, hardware, firmware, or combinations thereof including, but not limited to, the user's special software or a communication terminal obtained at the time of the user's registration.

The authorization information may be associated with the user's special software. Safeguards to prevent copying may be used with the software. For example, if a person attempts to copy the special software, then the software may include copy-prevention code to prevent copying of the authorization information code. The software may also disable the authorization information code in the duplicate code, the original code, or both, or cause the original code and the "copied" code to be different. The different code may not function properly, and could even provide an indication that the user is attempting improper, as opposed to simply unauthorized, access. These functions may be achieved using hardware associated with the software, or code in the software itself, as will be readily obvious to those of skill in the art.

Information supplied by the user or the user's communication line may be a useful supplement to the authorization information. For example, the user may provide data such as the user's name, age, social security number, and current location. Requiring this information may reinforce the need for the user to meet certain criteria for appropriate access to the host. Moreover, this requirement may help to prevent unauthorized access by users that may be ignorant, careless, or forgetful of the requirements for access to the host. Information associated with the user's communication line may assist in determining whether the user's current location satisfies the regulations for access to the host.

Each gatekeeper 108 has its own set of criteria required to be met by the authorization information for allowing access to the host 110. These criteria may differ between gatekeepers. For example, a gatekeeper may be associated with a particular jurisdiction (e.g., a state) having predetermined criteria for access to resources contained in, or controlled by, the host. Alternatively, the provider of the host's resources may establish or alter access criteria independently of any governmental, community, or other influences. The gatekeeper authorization criteria may be adapted to changes of jurisdiction or other regulatory influences.

The authorization criteria for a gatekeeper may include data related to the user's current location and identity. Access to some information or services may require knowledge of the person's location (e.g., within a particular state). The user may even be limited to access from one or more predetermined locations. Additionally, during registration a prospective user's identity may be determined by, for example, inspecting the user's driver's license or other picture identification. When the user requests access through the network, however, other techniques may be used to substitute for in-person identification.

To determine a user's location, the gatekeeper 108 may trace the access request to its source. This technique provides economies of scale because it may be implemented centrally without requiring the user to purchase additional hardware or equipment. The user's communication terminal 102 may contain software to help to locate the user. This software may be distributed on line to the user from an Internet service provider.

Figure 3A:
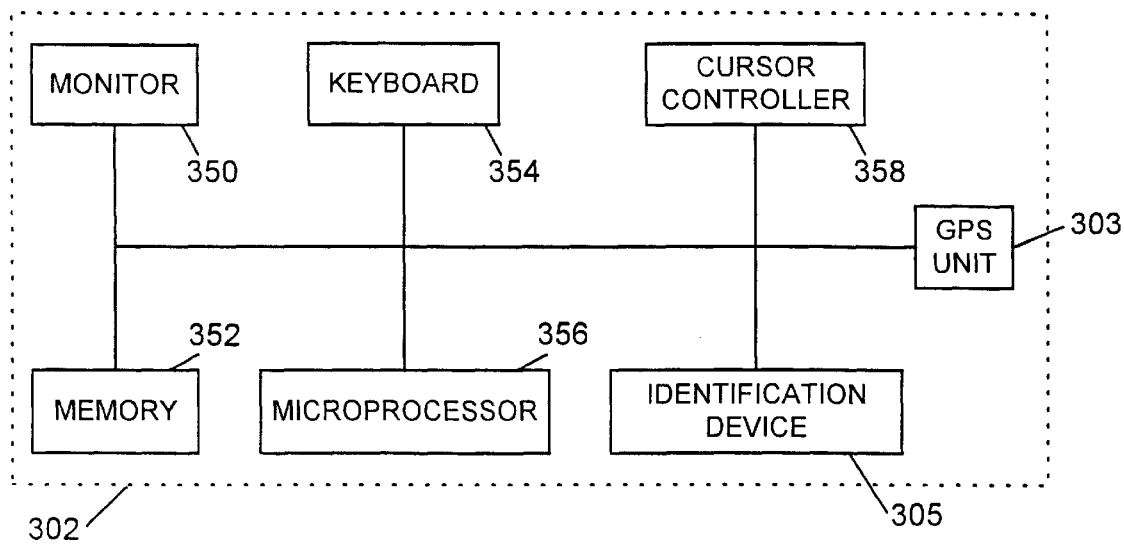
FIGS. 3A–3D are simplified block diagrams of communication terminals according to various embodiments of the present invention.
Figure 3B:
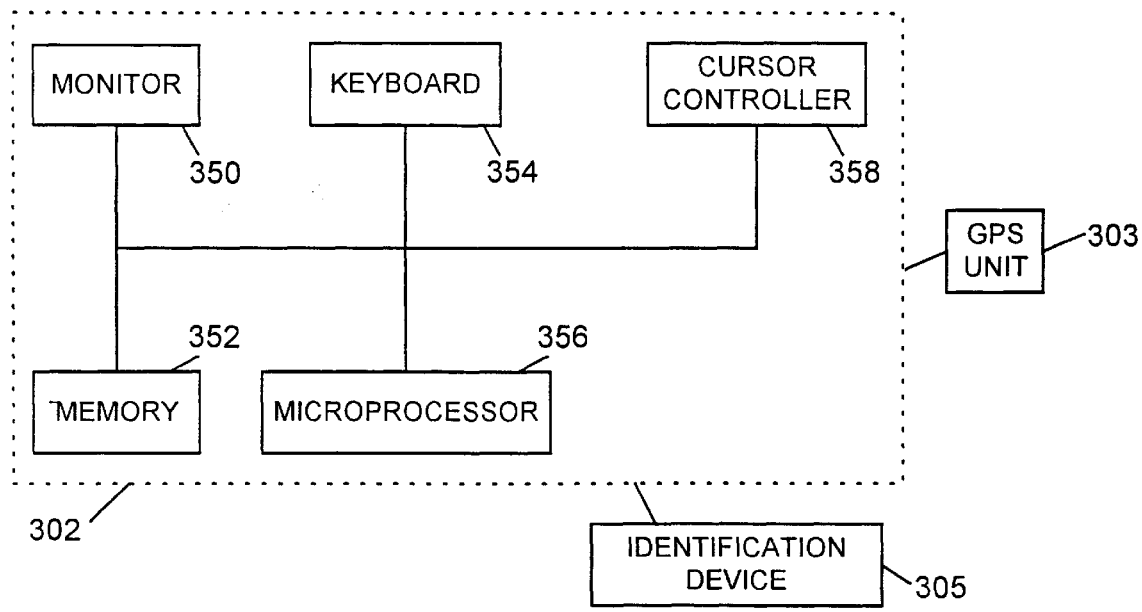
Figure 3C:
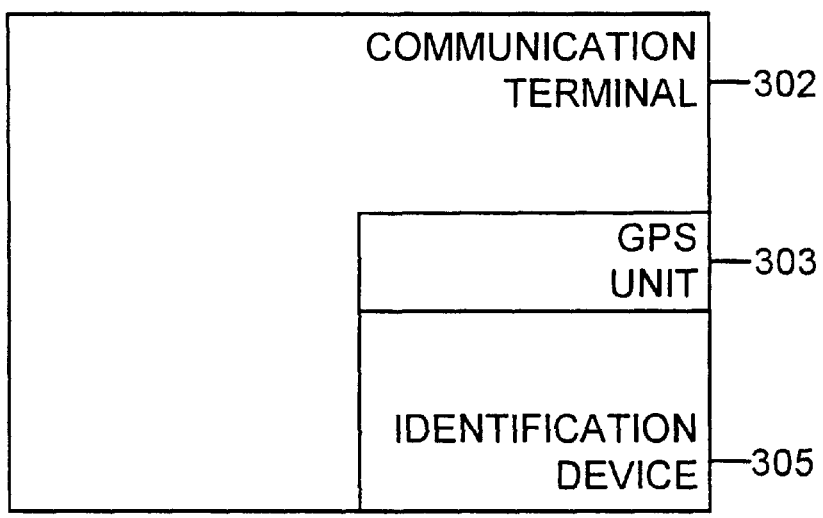
Figure 3D:
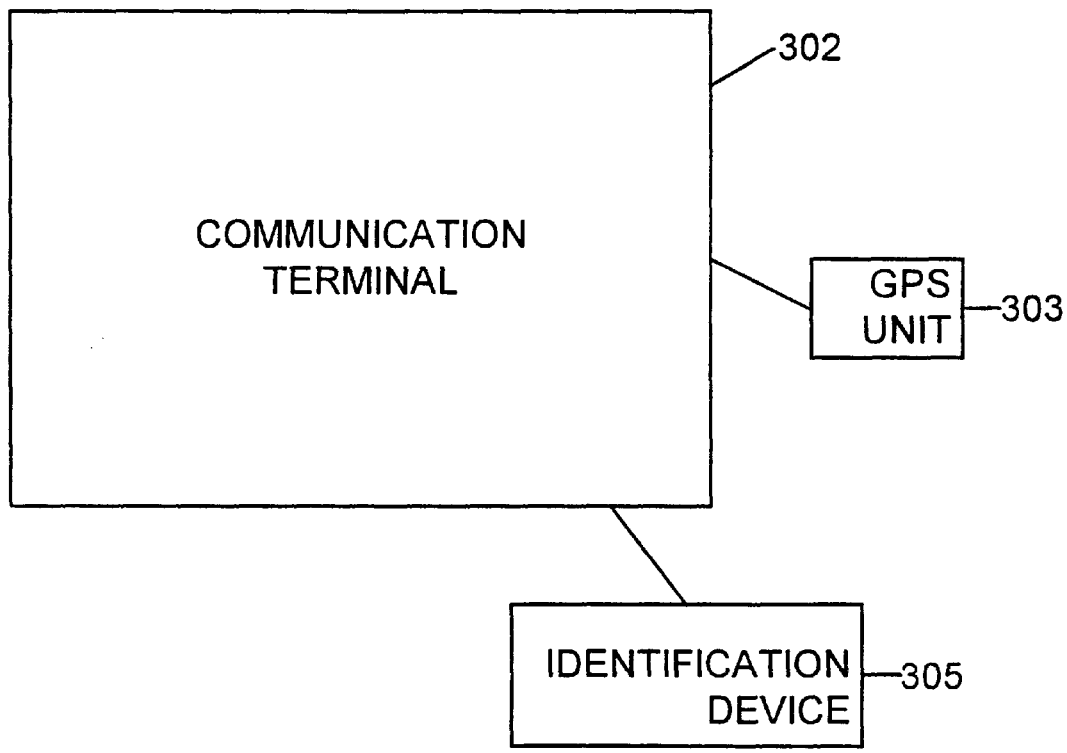

Another technique for determining the user's location may include a global positioning satellite ("GPS") system. FIGS. 3A–3D illustrate simplified block diagrams showing a GPS unit 303 used with a communication terminal 302. FIGS. 3A–3B illustrate a simplified block diagram of a computer as the communication terminal, while FIGS. 3C–3D show a generic communication terminal. The communication terminal or computer may include a monitor 350, a computer-readable memory 352, a keyboard 354, a microprocessor 356 and a cursor controller 358. The GPS unit may be incorporated into the user's communication terminal 302 (FIGS. 3A, 3C), or attached to it (FIGS. 3B, 3D) to transmit location information to the user's communication terminal 302. The gatekeeper 108 may then use this information to help to verify the user's current location and to determine whether that location meets the access criteria.

Several techniques may be used to assist in verifying the user's identification. FIGS. 3A–3D also illustrate an identification device 305 used with the communication terminal 302. To help to verify the user's identity, the identification device may scan a portion of the user's body, such as a fingertip or retina, to obtain a biometric measure of the user. Code in the software at the user's communication terminal or the gatekeeper 108 may then verify whether the user's fingerprint, or other stored biometric measure, matches that of the registered user. Similarly, a DNA analyzer or the like may provide identification verification. This list, of course, is not exhaustive. Such identification verification devices may be incorporated into the communication terminal 302 (FIGS. 3A, 3C) or attached to it (FIGS. 3B, 3D).

The location and identity of the user, or any other information, may be periodically monitored. If at any time the user's information changes to a condition where it no longer meets authorization criteria, then the user may be denied further access to the host 110 and/or the PNI 106. Periodic location monitoring may avoid users' gaining access to a host while in an approved region, but then venturing beyond the approved region into a zone from which access to the host is prohibited. With respect to identification verification, periodic monitoring may help to prevent registered users from gaining access to a host and then, intentionally or not, permitting nonregistered persons to gain access to the host from the same communication terminal.

Step 212 of FIG. 2 may also include providing identification verification of the gatekeeper and/or host to the user's communication terminal. In this manner, the user may confirm the identity of the gatekeeper and/or host to ensure that the user does not provide sensitive information to unintended destinations. With respect to a gaming application, this precaution helps to prevent users from placing wagers with undesired entities that may be unauthorized, illegal, or corrupt.

Step 212 may also include verifying authorization of another host to access a requested host. The hosts may be connected through their respective gatekeepers, allowing hosts to share resources. Some hosts may be restricted from accessing all or part of other hosts or the central repository. These restrictions may be imposed using the techniques described with respect to accessing the hosts 110 through the gatekeepers 108.

At step 214, the host acts on the user's instructions. These instructions may include, but are not limited to, indicating what information the user wishes the host to retrieve, what services (e.g., gaming services) the user wants the host to provide, or what information the user wants the host to store or otherwise process.

The user may instruct the host to perform a variety of retrieval and storage operations. The host may retrieve information from, or store information in, that host or another host, the central repository, the user network, or elsewhere. Once the host obtains the information, the host may send the information to the user's communication terminal. Of course, verification checks may be made to assure that the user has authorization to retrieve or store the information as requested.

Additionally, the user may instruct the host to perform a variety of other operations. For example, the user may want to buy or sell stocks or other items. The host itself may perform the operations, or may instruct other hosts or the central repository to perform the requested operations. After performance of the operation, the host may send information to the user regarding the results of the operation. Again, verification checks may be made to assure that the user has authorization to carry out the requested operation.

No matter how or where the host acquires resources or has operations performed, a host-user interface may be customized for the convenience of the user. For example, a host in one country may request a purchase of materials in a second country on behalf of a user in a third country. The user-host interface, which may include a computer screen display, would allow the user to understand and communicate with the host (e.g., by displaying information and receiving instructions in the user's language).

Alternatively, the user may download resources from the host or central repository. The user may then use these resources to, for example, monitor a bingo game or the stock market without accessing a host.

The present invention may be used with a variety of applications. For example, the present invention may permit users to play games including wagering games over a network such as the Internet, and to retrieve and send sensitive information over the Internet. This list is exemplary only and not exhaustive. Other applications, including applications not interfacing with the Internet, are within the scope of the present invention.

In a preferred embodiment, the present invention provides a gaming application that allows users to participate in gaming activities using the Internet. Such gaming may be interactive, noninteractive or both.

The user's instructions for a gaming application may include, but are not limited to, which game to play, how much to wager, and what gaming activity to monitor or about which to convey information. For example, the user may want to know the scores of various sporting events or the numbers previously drawn in a lottery, or may desire to wager money on a card game that the host will conduct.

The gatekeeper may be associated with a gaming jurisdiction and configured to enforce regulatory requirements of the jurisdiction. The gatekeeper may only allow access to some of the host's resources. For example, the user may be authorized to play some games, but not others (e.g., pay-per-play video games, but not wagering games). To allow access to only portions of the host, the gatekeeper may associate additional information with the authorization information.

The gatekeeper and the user's software may also enforce a variety of restrictions. These restrictions may include limiting the size of individual wagers or denying further wagering if the user has lost more than a predetermined amount of money within a predetermined period of time. Of course, many other restrictions may be imposed.

Gatekeepers may communicate among each other. Of course, various access restrictions may limit which gatekeepers may access all or parts of other gatekeepers. Even if access is restricted, however, allowing such access expands the flexibility of the system and the amount of resources available to users. Using gatekeeper interaction could, among other things, reduce waste in the system. For example, a single host or a few hosts could monitor a single event of interest, such as a professional football game, and other hosts could retrieve information from the monitoring host or hosts. The hosts could retrieve information from the monitoring host periodically, or even only once after the monitored event concludes.

A host, or on-line transaction processor, in a gaming application may monitor and perform a variety of gaming activities and operations by itself or through other hosts or the central repository. For example, a host may monitor sporting events, lotteries in the host's jurisdiction or other jurisdictions, or any other event of interest. This provides a convenient foundation for expanding the breadth of gaming on a multi-jurisdictional level. One or more hosts also may be eliminated from interacting with the game if desired.

Allowing interaction between hosts and the central repository expands the pool of resources available to users. The central repository, or game repository 114 in this case, could store multiple games from many jurisdictions. Players in one jurisdiction may then participate in the gaming activities of another jurisdiction. For example, several states may join to form a multi-state lottery played over the network. World-wide lotteries and gaming would also be possible.

Applying these techniques, the host may perform, or request performance of, acts such as placing the user's wager, operating or monitoring the gaming activity, indicating the results, charging the user for losses, and paying the user for winning wagers. The various security precautions provided by the present invention, including user and gatekeeper identification verification, provide improved techniques for payout and collection control.

The host may send the user an "electronic receipt" of the user's activities. An electronic signal sent to the user's communication terminal from the host may provide, for example, a record of the user's transactions and results of the transactions. This signal may be encrypted to protect the user's privacy regarding the user's transactions. A similar electronic receipt may be provided with applications other than gaming applications, such as the provision of sensitive information.

Returning to FIG. 2, when no more user instructions exist, or the user terminates the access request, the method proceeds to step 216, where access is terminated.

The method described above is exemplary only and not limiting. Steps may be added, deleted, or altered without deviating from the present invention. The order in which the steps occur may also be rearranged. For example, as described above, a user may register and then obtain specialized software such as by downloading the software. Alternatively, the user may download software, and thereafter register. In this case, the user's specialized software may not be approved for access until the user has properly registered.

The present invention may provide assurances for secure transactions not afforded by other techniques. For example, the "extranet" separation from the user network, where assurances of the party at either end of a communication may be few if any, provides numerous possibilities and flexibility as to how transactions may occur and be regulated.

Many features of the present invention have been described as being implemented with software. This, however, is not required. Various functions described may be implemented by using hardwiring, hardware, firmware, or software, or combinations of these. As such, functions described as relating to or residing in specific components may be performed in other components, either in whole or in part. A component may be eliminated if its functions are not required or are transferred to other components. For example, the gatekeepers could implement many or all of the functions described as residing in the PNI. The gatekeepers could then serve as interfaces to the user network. The gatekeepers could form a private network among themselves directly connected to, but remote in access from, the user network.

While the above description provides a full and complete disclosure of preferred embodiments of the present invention, various modifications, alternative constructions, and equivalents are possible. For example, the GPS unit may be replaced by a local positioning system unit. Users may register on line and then show identification in person to gain access to resources such as gaming terminals. Instead of the user's communication terminal providing authorization information to a gatekeeper for authorization verification, the host may supply a scrambled or encrypted signal to the communication terminal. The communication terminal may decrypt the signal only if properly equipped, such as with appropriate software obtained through in-person registration.

Other embodiments are within the scope of the following claims.

What is claimed is:

1. A system for performing regulated transactions for use with a network that is commonly accessible by a plurality of communication terminals, the system comprising:

a gatekeeper, coupled to the network, adapted to permit access to the system only if authorization information, as indicated by an authorization signal received by the gatekeeper from a communication terminal via the network, complies with at least one predetermined criterion, the authorization information being associated with the communication terminal and being independent of information supplied by a user of the communication terminal and independent of information indicative of a communication line coupling the communication terminal to the gatekeeper via the network; and a host, coupled to the gatekeeper, that receives a first signal from the communication terminal through the network and sends a second signal through the network to the communication terminal in response to the first signal.

2. The system of claim 1 wherein the authorization signal is encoded and the gatekeeper is capable of decoding the authorization signal.

3. The system of claim 1 wherein the gatekeeper transmits an identification signal over the network indicative of the identity of the gatekeeper to the communication terminal.

4. The system of claim 1 wherein the first signal is indicative of a gaming instruction and the host performs a gaming operation and generates the second signal indicating a result of the gaming operation corresponding to the gaming instruction indicated by the first signal.

5. The system of claim 1 further comprising a game repository, coupled to the gatekeeper, that stores a plurality of games.

6. The system of claim 5 wherein the host is capable of downloading games from the game repository through the gatekeeper.

7. The system of claim 5 wherein the first signal is indicative of a gaming instruction, the game repository performs a gaming operation, and the host communicates with the game repository and generates the second signal indicating a result of the gaming operation corresponding to the gaming instruction indicated by the first signal.

8. The system of claim 1 wherein the gatekeeper and host are associated with a gaming jurisdiction and the at least one predetermined criterion requires that the authorization signal is indicative of the user's compliance with regulations of the gaming jurisdiction.

9. The system of claim 1 wherein the authorization information is associated with a person that has met authorization requirements as verified by having appeared in person at a predetermined location.

10. A gaming system for use with a network that is commonly accessible by a plurality of communication terminals, the system comprising:

a host capable of receiving a first signal indicative of a gaming instruction and transmitting a second signal indicative of a result of a gaming operation;

a gatekeeper, coupled to the host and to the network, adapted to analyze data from a source and to permit access to the host only to sources of authorized data associated with the sources; and a game repository, coupled to the gatekeeper, that stores a plurality of games;

wherein the host is adapted to access a game in the game repository to determine the second signal; and wherein the gatekeeper and game repository are adapted to permit access to games stored in the game repository only to sources of authorized data associated with the sources and to the host if the host meets at least one authorization requirement.

11. The system of claim 10 wherein the host is a first host and the gatekeeper is a first gatekeeper, the system further comprising:

a second host;

a second gatekeeper coupled to the second host;

an access controller, coupled to and interposed between the network and the gatekeepers, adapted to control access to the first gatekeeper by a communication terminal user and by the second gatekeeper.

12. The system of claim 11 wherein the access controller is further coupled to the game repository and adapted to control access to the repository by the gatekeepers.

13. The system of claim 11 wherein the network comprises a network known as the Internet and the access controller comprises a private network that is accessible through an Internet site.

14. A computer program product for use with a system including a network that is commonly accessible by a plurality of communication terminals and an access control device coupled to the network, the computer program product comprising:
   a computer-readable memory comprising:
      authorization signal code that causes a communication terminal to supply an authorization signal to the access control device via the network, the authorization signal being indicative of authorization information that is associated with the computer program product and that is independent of information supplied by a user of the computer program product and independent of information indicative of a communication line coupling the communication terminal to the access control device via the network.

15. The computer program product of claim 14 wherein the computer-readable memory further comprises code that processes an authorization response signal, received from the access control device, indicative of a response to the authorization signal.

16. The computer program product of claim 14 wherein the system further includes a host device, coupled to the access control device, to which a user desires access and wherein the computer-readable memory further comprises:
   code that allows the user to instruct the communication terminal to supply an action signal to the host device; and
   code that processes an action response signal indicative of a response to the action signal.

17. The computer program product of claim 14 wherein the computer-readable memory further comprises copy-prevention code that prevents duplication of the authorization signal code.

18. The computer program product of claim 17 wherein the authorization signal code is original authorization signal code and wherein the copy-prevention code causes an attempted copying of the original authorization code to create new authorization signal code that is different from the original authorization signal code.

19. The computer program product of claim 14 further comprising alteration code that disables the authorization signal code if a copy of the authorization signal code is attempted to be made.

20. The computer program product of claim 14 wherein the computer-readable memory is adapted for use with multiple software platforms.

21. The computer program product of claim 14 wherein the authorization signal code is written in JAVA programming language.

22. The computer program product of claim 14 wherein the computer-readable memory further comprises code that processes a global positioning signal and instructs the communication terminal to send a location signal indicative of information in the global positioning signal to the access control device.

23. The computer program product of claim 14 wherein the computer-readable memory further comprises code that instructs the communication terminal to send a location signal indicative of a location of the communication terminal to the access control device.

24. The computer program product of claim 14 wherein the computer-readable memory further comprises code that instructs the communication terminal to send user-identification information to the access control device periodically.

25. A computer program product for use with a system including a network that is commonly accessible by a plurality of communication terminals, a host device to which a user desires access, and an access regulator, coupled to the host device and to the network, that regulates access to the host device, the computer program product comprising:
   a computer-readable memory comprising:
      code that processes an authorization signal, received from a communication terminal, indicative of authorization information that is associated with the communication terminal and that is independent of information supplied by the user and independent of information indicative of a communication line coupling the communication terminal to the access regulator via the network; and
      code that instructs the access regulator to permit the communication terminal to communicate with the host device only if the authorization information meets at least one predetermined criterion.

26. The computer program product of claim 25 wherein the computer-readable memory further comprises code that determines a location of the communication terminal.

27. The computer program product of claim 25 wherein the computer-readable memory further comprises code that processes a location signal indicative of a location of the communication terminal.

28. The computer program product of claim 25 further comprising:
   code that receives a gaming action signal indicative of a gaming action desired by a user;
   code that determines an outcome of the desired gaming action; and
   code that causes transmission of an outcome signal to the communication terminal indicative of the outcome of the user's desired gaming action.

29. The computer program product of claim 28 further comprising code that performs a game.

30. The computer program product of claim 28 for use with a game repository storing a plurality of games, the computer program product further comprising code that instructs the game repository to perform a game.

31. The computer program product of claim 28 further comprising code that receives outcomes of activities of gaming interest via the network.

32. A system for performing regulated transactions for use with a network that is commonly accessible by a plurality of communication terminals, the system comprising:
   a repository that stores a plurality of computer programs; and
   a transaction controller, coupled to the network and to the repository;
   wherein access to a program by the transaction controller is permitted only if appropriate authorization information that is associated with a communication terminal is independent of information supplied by a communication terminal user and independent of information indicative of a communication line coupling the communication terminal to the transaction controller via the network.

33. The system of claim 32 wherein the transaction controller is capable of downloading a program from the repository.

34. The system of claim 32 wherein the transaction controller is capable of instructing the repository to run a selected program.

35. The system of claim 34 wherein the repository transmits results of the running of the program to the transaction controller.

36. The system of claim 34 wherein the transaction controller sends an authorization signal associated with the transaction controller to the repository.

37. The system of claim 32 wherein the authorization information is associated with a person that has met authorization requirements as verified by having appeared in person at a predetermined location.

38. A method of authenticating a transmission from a communication terminal, the method comprising:

transmitting an authentication signal from a communication terminal to an access controller, the authentication signal indicative of authorization information that is associated with the communication terminal and that is independent of information supplied by a communication terminal user and independent of information indicative of a communication line that conveys data from the communication terminal to the access controller; and verifying that the authorization information meets predetermined criteria.

39. The method of claim 38 wherein the authentication information is associated with software resident in the communication terminal.

40. The method of claim 38 further comprising transmitting a transaction controller identification signal from the transaction controller to the communication terminal, the transaction controller identification signal indicative of an identity of the transaction controller.

41. The method of claim 38 further comprising transmitting a user identification signal from the communication terminal to the transaction controller, the user identification signal being indicative of an identity of the user of the communication terminal.

42. The method of claim 41 wherein the user enters information indicative of the identity of the user.

43. The method of claim 41 wherein an identification device produces the user identification signal after analyzing a physical feature of the user.

44. The method of claim 38 wherein the verifying step comprises comparing the authorization information with predetermined data parameters.

45. The method of claim 38 wherein the verifying step comprises:

processing the authorization information according to a predetermined operation; and comparing results of the operation with predetermined result parameters.

46. The method of claim 38 further comprising transmitting a gaming instruction to a host if the verifying step is successful.

47. The method of claim 46 further comprising processing the gaming instruction in the host.

48. A method of claim 38 further comprising associating authorization information with a qualified person that appears in person at a predetermined location.

49. A method of gaming using a network that is commonly accessible by a plurality of gaming terminals, the method comprising:

receiving a first gaming instruction signal at a first host from a gaming terminal via the network;

verifying whether the first host and the gaming terminal meet at least one authorization requirement for accessing a game corresponding to the first gaming instruction signal;

transmitting a first request signal, corresponding to the first gaming instruction signal, from the first host to a central repository that stores a plurality of games;

receiving a second gaming instruction signal at a second host from a gaming terminal via the network;

verifying whether the second host and the gaming terminal meet at least one authorization requirement for accessing a game corresponding to the second gaming instruction signal; and transmitting a second request signal, corresponding to the second gaming instruction signal, from the second host to the central repository.

50. The method of claim 48 further comprising downloading a gaming program from the central repository to the first host.

51. The method of claim 48 further comprising performing a gaming operation in the central repository corresponding to the first request signal.

52. The method of claim 48 further comprising transmitting information corresponding to the first request signal from the central repository to the first host.

53. The method of claim 48 wherein the first and second gaming instruction signals are received from at least one communication terminal, the method further comprising verifying, before the receiving and transmitting steps, that authentication information from the at least one terminal meets at least one criterion, the authentication information being associated with the at least one communication terminal and being independent of data entered by a user of the at least one terminal and independent of information indicative of a communication line coupling the at least one terminal to the first and second hosts via the network.

54. A computer program product for use with a system including a network that is commonly accessible by a plurality of communication terminals and an access control device coupled to the network, the computer program product comprising instructions for causing a computer to:

cause a communication terminal to supply an authorization signal to the access control device via the network, the authorization signal being indicative of authorization information that is associated with the computer program product and that is independent of information supplied by a user of the computer program product and independent of information indicative of a communication line coupling the communication terminal to the access control device via the network.

55. The computer program product of claim 54 further comprising copy-prevention instructions for causing a computer to prevent duplication of the instructions to cause a communication terminal to supply an authorization signal.

56. The computer program product of claim 55 wherein the instructions to cause a communication terminal to supply an authorization signal are original authorization signal instructions and wherein the copy-prevention instructions produce, in response to an attempted copying of the original authorization signal instructions, new authorization signal instructions that are different from the original authorization signal instructions.

57. The computer program product of claim 54 further comprising alteration instructions that disable the authorization signal instructions if a copy of the authorization signal instructions is attempted to be made.

58. The computer program product of claim 54 further comprising instructions for causing a computer to process a global positioning signal and to send a location signal indicative of information in the global positioning signal to the access control device.

59. The computer program product of claim 54 further comprising instructions for causing a computer to send a location signal indicative of a location of the communication terminal to the access control device.

60. The computer program product of claim 54 further comprising instructions for causing a computer to send user-identification information to the access control device periodically.

61. The computer program product of claim 54 further comprising instructions for causing a computer to produce user-identification information in response to analysis of a physical feature of the user.

62. The computer program product of claim 54 wherein the information independent of information supplied by a user of the computer program product is associated with personal data of the user that are objectively verifiable in person.

63. The computer program product of claim 62 wherein the personal data include an identity of the user.

64. The computer program product of claim 62 wherein the personal data include an age of the user.

65. A computer program product for use with a system including a network that is commonly accessible by a plurality of communication terminals, a host device to which a user desires access, and an access regulator, coupled to the host device and to the network, that regulates access to the host device, the computer program product comprising instructions for causing a computer to:

process an authorization signal received from a communication terminal indicative of authorization information that is associated with the communication terminal and that is independent of information supplied by the user and independent of information indicative of a communication line coupling the communication terminal to the access regulator via the network; and permit the communication terminal to communicate with the host device only if the authorization information meets at least one predetermined criterion.

66. The computer program product of claim 65 further comprising instructions for causing a computer to determine a location of the communication terminal.

67. The computer program product of claim 65 further comprising instructions for causing a computer to process a location signal indicative of a location of the communication terminal.

68. The computer program product of claim 65 for use with a game repository storing a plurality of games, the computer program product further comprising instructions for causing the game repository to perform a game.

69. The computer program product of claim 65 wherein the authorization information is associated with a person that has met authorization requirements as verified by having appeared in person at a predetermined location.

* * * * *